United States Patent
Auweder et al.

(10) Patent No.: US 11,428,337 B2
(45) Date of Patent: Aug. 30, 2022

(54) NON-RETURN VALVE AND CONNECTION DEVICE FOR A NON-RETURN VALVE

(71) Applicant: OTTO EGELHOF GmbH & Co. KG, Fellbach (DE)

(72) Inventors: Andreas Auweder, Vaihingen an der Enz (DE); Eike Willers, Stuttgart (DE); Betina Jahnke, Obersteinenberg (DE); Bernhard Wagner, Fellbach (DE)

(73) Assignee: OTTO EGELHOF GmbH & Co. KG, Fellbach (DE)

( * ) Notice: Subject to any disclaimer, the term of this patent is extended or adjusted under 35 U.S.C. 154(b) by 1 day.

(21) Appl. No.: 17/126,313

(22) Filed: Dec. 18, 2020

(65) Prior Publication Data
US 2021/0190225 A1 Jun. 24, 2021

(30) Foreign Application Priority Data
Dec. 19, 2019 (DE) ...................... 10 2019 135 310.6

(51) Int. Cl.
| | |
|---|---|
| *F16K 15/06* | (2006.01) |
| *F16K 27/02* | (2006.01) |
| *F25B 41/20* | (2021.01) |

(52) U.S. Cl.
CPC ........ *F16K 27/0209* (2013.01); *F16K 15/063* (2013.01); *F25B 41/20* (2021.01)

(58) Field of Classification Search
CPC ............... F16K 27/0209; F16K 15/063; F16K 2200/502; F16K 25/005
See application file for complete search history.

(56) References Cited

U.S. PATENT DOCUMENTS

| | | | | |
|---|---|---|---|---|
| 4,203,466 A | * | 5/1980 | Hager | .................... F16J 15/062 137/543 |
| 4,862,913 A | * | 9/1989 | Wildfang | .............. F16K 15/063 137/543 |

(Continued)

FOREIGN PATENT DOCUMENTS

JP 2001280521 10/2001

*Primary Examiner* — P. Macade Nichols
(74) *Attorney, Agent, or Firm* — Renner, Otto, Boisselle & Sklar, LLP (57) ABSTRACT

The invention relates to a non-return valve, in particular for a refrigeration circuit or thermal circuit, which is insertable into a connection point (76) of a connection device (71), which comprises a supply opening (72) for supplying a medium and an outlet opening (74) for discharging the medium, comprising a multi-part housing (12, 14), which comprises a valve housing (14) and a main housing (12), which is interconnectable by means of connection elements (41, 42) via an interface (16), comprising a regulating space (24) formed between the main housing (12) and the valve housing (14), in which space a valve-closing member (25) is provided which abuts a valve seat (23) of the valve housing (14) in a closed position (54), and closes an opening (22) in the valve housing (14) and is movable into an operating position (55) counter to an actuating force of a return element (33) and releases the valve opening (22), wherein the valve housing (14) and the valve-closing member (25), which is arranged so as to be movable in the regulating space (24), lie on a common longitudinal axis (64), wherein the interface (16) between the valve housing (14) and the main housing (12) has axial play, by means of which the distance between the valve housing (14) and the main housing (12) is modifiable.

20 Claims, 3 Drawing Sheets

(56) References Cited

U.S. PATENT DOCUMENTS

| | | | | |
|---|---|---|---|---|
| 5,195,552 A | * | 3/1993 | Nehm | E03C 1/104 |
| | | | | 137/269 |
| 2004/0118458 A1 | * | 6/2004 | Jungmann | B01D 35/147 |
| | | | | 137/543 |

* cited by examiner

NON-RETURN VALVE AND CONNECTION DEVICE FOR A NON-RETURN VALVE

This application claims priority of German Application No. 10 2019 135 310.6 filed Dec. 19, 2020, which is hereby incorporated herein by reference.

The invention relates to a non-return valve, in particular for a refrigeration circuit or thermal circuit, and to a connection device for a non-return valve of this kind.

A non-return valve is known from JP 2001 280521 A. This non-return valve comprises a multi-part housing, which comprises a valve housing and a main housing. A valve-closing member which, in a starting position, fits into the valve seat and closes a valve opening is provided in the valve housing. A guide portion which extends through the main housing is provided on the valve-closing member. On an upper end opposite the valve seat, the valve housing comprises openings in which catches on the main housing engage once the main housing is positioned relative to the valve housing with the valve-closing member therebetween. In this case, the catches engage with the valve housing by means of the undercut in a rigid and interlocking manner. In this non-return valve, it is provided that the flow direction of the medium lies in an axial longitudinal axis of the valve housing and the main body, along which the opening and closing movement of the valve-closing member takes place.

The object of the invention is to propose a non-return valve, in particular for a refrigeration circuit or thermal circuit, which is easier to install in a connection point of a connection device in order to control a flow rate of a medium.

This object is achieved by a non-return valve in which an interface is formed between the valve housing and the main housing by means of connection elements, such that the interface between the valve housing and the main housing has play in the axial direction of the non-return valve, by means of which the distance between the valve housing and the main housing can be modified. The interface may preferably be formed by connection elements which snap together. This arrangement has the advantage that it makes it easier to install the non-return valve in a connection point of a connection device owing to tolerance compensation in the axial direction. In the non-return valve, a sealing arrangement of the valve housing relative to the connection point and a sealing arrangement of the main housing relative to the connection point are preferably provided, it being possible, when viewed in the axial direction, for tolerances to be produced in relation to the length and/or the distance of the connection portions or insertion portions between the connection portion or insertion portion receiving the valve housing and the main housing in each case. By means of the configuration of the non-return valve, in which the valve-closing member and the main body having axial play in their total length can be modified at least to a limited extent by the axial play, these tolerances can be compensated for.

It is preferably provided that the main housing and the valve housing are guided so as to be movable relative to one another along their longitudinal axis. As a result, the total length of the non-return valve can be modified in a simple manner to the extent of the axial play, meaning that there is increased tolerance when installing the non-return valve in the connection device.

It is advantageously provided that the interface of the valve housing and the main housing are guided so as to be radially rotatable relative to one another. This has the advantage that a preferred direction is not required when installing the non-return valve in the connection point. Instead, said valve can be inserted into the connection point of the connection device with an orientation in any direction.

Another advantageous configuration of the non-return valve provides that the interface comprises connection elements which form a detachable connection. As a result, a part of the non-return valve, for example the valve housing and/or the valve-closing member, which are subjected to wear, can also be replaced.

The connection elements of the non-return valve are advantageously formed by a circumferential groove and at least one snap-in clip, preferably a plurality of snap-in clips. In this case, it is preferably provided that the circumferential groove is provided in the main housing and the at least one snap-in clip is formed on the valve housing. It may also be possible to swap these over. In order to produce the play, it is preferably provided here that the snap-in clip has a length that is less than the width of the circumferential groove starting from the undercut as far as the end-face end of the snap-in clip. As a result, it is possible to determine and limit the axial play in a simple manner.

The connection elements for forming the interface preferably each comprise guide surfaces directed towards one another, a guide surface on the main housing extending from the circumferential groove towards the valve housing and the guide surface of the connection element adjoining the undercut extending in the groove. As a result, the interface can withstand more stress.

Furthermore, it is preferably provided that a circumferential guide flange is provided on the valve housing so as to point towards the main housing, which flange is preferably interrupted by the at least one connection element, in particular by the at least one snap-in clip, when viewed in the radial direction. As a result, the function of the snap-in clip is separate from the guide flange, with both the connection element and the guide flange preferably being able to act on an inner circumferential wall of the main housing.

The valve housing is preferably axially movably and/or radially rotatably guided on the guide surface of the main housing by means of the guide flange opposite the valve seat. This makes it possible to securely position the valve housing relative to the main housing. At the same time, the valve-closing member can therefore also be securely received in the regulating space, which is formed between the valve housing and the main housing.

The size of the play or the axial movability between the valve housing and the main body is preferably configured as follows. In an arrangement of the connection elements in the interface with play relative to one another, a distance between a mounting surface or mounting portion provided on the main housing and an end face of the valve housing opposite the main housing has an installation length A that is less than an installation dimension E in the connection point of the connection device. When the main housing is arranged relative to the valve housing without play, i.e. when the valve housing is in a pulled-out position relative to the main housing, the non-return valve has a size that is greater than the installation dimension E starting from the mounting surface or mounting portion of the main housing as far as the end face of the valve housing.

Another preferred configuration of the non-return valve provides that the valve housing comprises the valve opening which is oriented towards the valve housing in the longitudinal axis and, starting therefrom, comprises a radial wall portion, on the end of which opposite the valve opening at least the valve element for the interface is provided. The valve housing is thus cage-like. The valve-closing member is guided so as to move along the longitudinal axis of the valve housing within the cage-like valve housing.

Furthermore, it is preferably provided that through-holes are provided in the radial wall portion of the valve housing and are elongate and extend in the circumferential direction of the wall portion, with connecting pieces which connect the valve seat to the at least one connection element of the valve housing extending between the through-holes. This arrangement makes it possible for a flow of a medium to be deflected by the non-return valve by 90°, by the flow being supplied to the valve housing axially, for example, and being able to be discharged in the radial direction through the through-hole in the valve housing.

Advantageously, a guide rod or guide portion is provided on the valve-closing member, which rod or portion extends into the main housing and is longitudinally movably guided in the main housing. Advantageously, the return element is provided between the main housing and the valve-closing member.

As a result, the return element can be provided in an initial position or closed position in a simple manner.

Advantageously, the non-return valve can consist of just four components, i.e. the main housing, the valve housing, the valve-closing member and the return element. Two or three sealing elements, in particular sealing rings, are preferably sufficient, with one being provided on the valve housing and one on the main housing, in order to seal the respective connection points at the connection point, and optionally one sealing element being provided on the valve-closing member.

The valve-closing member preferably comprises guide fins opposite the closing surface adjoining the valve-closing member, which fins extend in parallel with the longitudinal axis of the valve-closing member. The valve-closing member can be guided by these guide fins, in addition to the guide element, which is movably received in the main housing. In particular when axially supplying the flow and deflecting it in the radial direction, an eccentric orientation of the valve-closing member relative to the longitudinal axis or the opening of the valve housing can therefore be prevented.

It is advantageously provided that the guide fins comprise a radially outwardly pointing end face, the axial length of which is greater than the width of the through-holes. As a result, in a starting position of the valve-closing member, the guide fins extend away through the through-holes in the radial wall portion. As a result, the valve-closing member can be securely guided within the valve housing irrespective of the opening movement. In addition, due to the height of the guide fin on the valve-closing member, an opening movement of the valve-closing member within the valve housing can be limited by the guide fin abutting the main body.

Another preferred configuration of the non-return valve provides that the valve seat of the valve housing comprises a support surface, which points towards the valve opening and which the valve-closing member abuts in a closed position and comprises a sealing surface, which a sealing element of the valve-closing member abuts, the support surface and the sealing surface being formed separately from one another. Advantageously, the support surface and the sealing surface can directly adjoin one another. This arrangement has the advantage that the closing movement of the valve-closing member and the closed position are delimited by the support surface. The sealing element of the valve-closing member may abut the sealing surface with a sealing effect without the entire closing force of the valve-closing member acting on the sealing element. As a result, leakage or premature wear of the sealing element can be counteracted by using the material of the sealing element.

Furthermore, it is preferably provided that the support surface of the valve seat is oriented at an angle of from 10° to 90° to the longitudinal axis of the valve housing. The sealing surface is preferably formed at an angle of 90° to the longitudinal axis of the valve housing, or less. The sealing surface is preferably oriented at an angle that is less than or greater than the angle of the support surface, in order to form the valve seat.

If the angle of orientation of the sealing surface is less than that of the support surface, radial sealing of the valve seat can preferably be achieved. If the angle of orientation of the sealing surface is greater than the angle of the support surface, axially acting sealing can also be provided.

By means of an axial distance between the sealing surface and the support surface on the valve seat, a contact pressure of the sealing element of the valve-closing member can preferably be adjusted. This makes it possible both for the sealing element to be positioned on the valve-closing member in a sealing manner and for excessively high contact pressure not to act on the sealing element in the closed position of the valve-closing member in the valve seat, in order to prevent the sealing element from yielding or becoming stuck.

A sealing element may be mounted on, clamped to or pressed onto the valve-closing member. For radial sealing, the seal may preferably be introduced or inserted into a circumferential groove, for example in the form of a sealing ring. Alternatively, the sealing element may also be vulcanised onto the valve-closing member. Likewise, the valve-closing member may be designed as a two-component part, on which a sealing element made of elastomer is produced in one piece with the valve-closing member made of thermoplastic material. A seal acting in the axial direction can in particular be formed in a two-component part of this kind. Furthermore, the sealing element can be bonded to the valve-closing member and/or can be retained thereon in an interlocking fit.

The valve housing and the valve-closing member are preferably made of plastics material. The main housing may, for example, also be made of plastics material or a metal material, in particular light metal or the like. Preferably, aluminium or an aluminium alloy or the like can be used.

The object addressed by the invention is also achieved by a connection device for a non-return valve, in particular according to any of the above-described embodiments, in which the connection point in the base body of the connection device comprises a supply opening and an outlet opening, a first insertion portion being provided between the supply opening and the outlet opening, in which portion the valve housing can be positioned, and a second insertion portion being provided between the supply opening and an outlet opening of the connection point, in which portion the main housing of the non-return valve can be fixed, the main body of the non-return valve being fixed in the second insertion portion in the axial direction towards the connection point by means of a detachable fastening means, and the valve housing being positioned in the first insertion portion so as to be movable in the axial direction. By means of the non-return valve, in which the valve housing and the main housing are arranged so as to movable relative to one another with axial play, in particular in the interface between the main housing and the valve housing, a simple and secure installation can be made possible at a connection point of this kind. Tolerances between the first and the second insertion portion in the connection point of the connection device and/or in the installation dimension of the non-return valve can in particular be compensated for in the axial direction.

In the connection device, it is preferably provided that the non-return valve is fixed in the second insertion portion by a detachable fastening element. The main housing is supported on a shoulder of the second insertion portion by the stop surface, and the main housing is retained so as to be fixed relative to this shoulder by the detachable fastening element, which acts on a mounting portion of the main housing opposite the stop surface. For simple mounting, the main housing can be arranged in the second insertion portion with little play. This makes it possible to fix the non-return valve in the connection point in a simple manner. In particular by designing the detachable fastening element as a circlip, the non-return valve can be rapidly mounted and secured in the connection point. This detachable fastening element may be designed as a circlip or a sprung ring, for example. This allows for simple mounting. Furthermore, a fastening flange may also be provided with a thread, a rotary latching connection, a bayonet catch or the like as a detachable fastening element.

Furthermore, it is preferably provided that a sealing element is provided both between the main housing and the second insertion portion and between the valve housing and the first insertion portion. This sealing element is preferably oriented so as to act on the main housing and the valve housing in a radial direction. As a result, reliable sealing between the regulating space and the outlet opening as well as between the supply opening and the regulating space of the non-return valve is made possible. In addition, simple insertion into the connection point is made possible.

The invention as well as advantageous embodiments and developments thereof are described and explained in greater detail in the following with reference to the examples shown in the drawings. The features found in the description and the drawings can be implemented according to the invention either individually or together in any combination. In the drawings.

Figure 1:
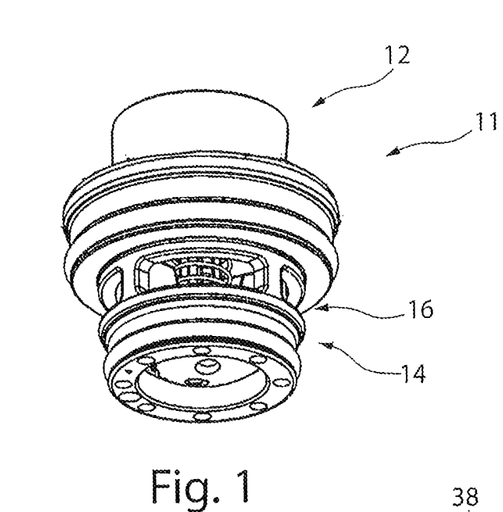
FIG. 1 is a perspective view of a non-return valve.

FIG. 1 is a perspective view of a non-return valve 11. This non-return valve 11 comprises a main housing 12 and a valve housing 14. The valve housing 14 is connected to the main housing 12 via an interface 16.

Figure 2:
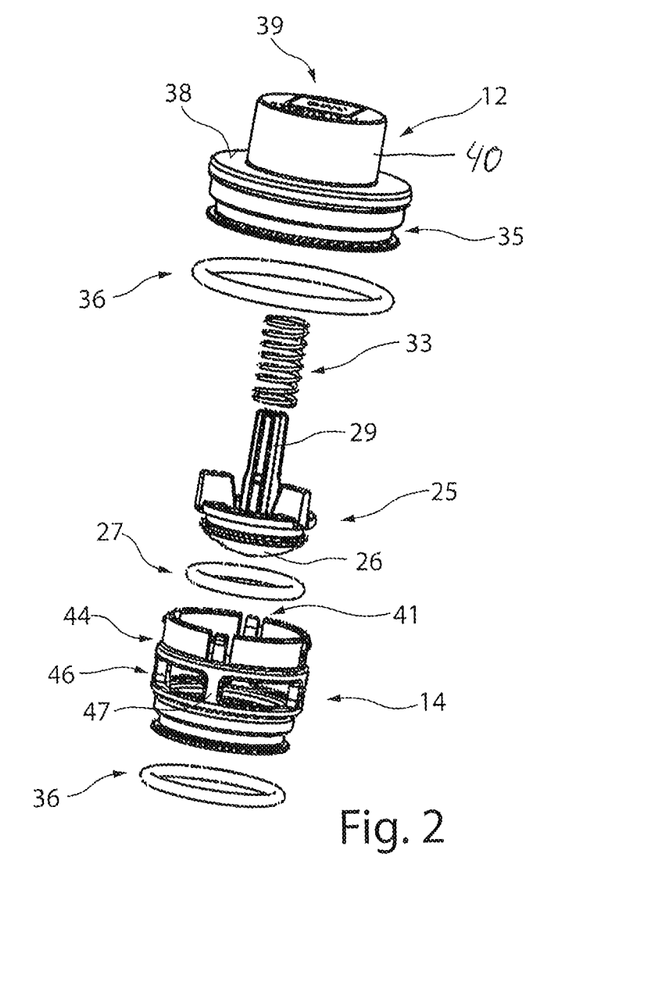
FIG. 2 is an exploded view of the non-return valve.

FIG. 2 is an exploded view of the non-return valve 11 according to FIG. 1. The individual components of the non-return valve 11 and the construction can be seen from this exploded view.

The valve housing 14 is advantageously formed in one piece. This valve housing 14 preferably has a cage-like construction. A valve opening 22 which is surrounded by a valve seat 23 is provided on an end face 21 of the valve housing 14 opposite the main housing 12. A valve-closing member 25 which opens and closes the valve opening 22 is provided in the valve housing 14. The valve-closing member 25 comprises a closing surface 26. A sealing element 27 is provided so as to be adjacent to this closing surface 26. Preferably, this sealing element 27 is provided in a radially circumferential groove in the valve-closing member 25.

The valve-closing member 25 further comprises a guide portion 29, which is guided in a guide hole 31 in the main housing 12. A return element 33 is provided between the valve-closing member 25 and the main housing 12. This return element 33 is preferably guided by the guide portion 29 and is retained between the valve-closing member 25 and the main housing 12.

Figure 7:
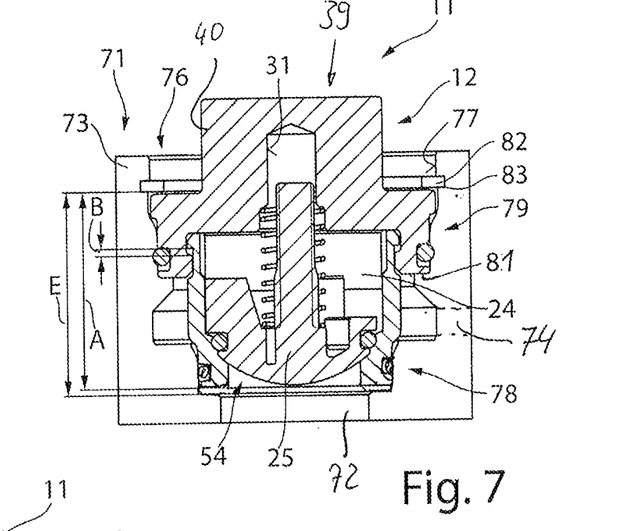
FIG. 7 is a schematic sectional view of the non-return valve in a connection point of a connection apparatus in a closed position.

The main housing 12 comprises an externally circumferential groove 35, which is provided for receiving a sealing element 36. A stop surface 37 is provided on the main housing 12 so as to be adjacent to this groove 35 and so as to point towards the valve housing 14. Opposite this, a mounting surface or mounting portion 38 is arranged on the main housing 12. This main housing 12 is cylindrical, for example. A surface may, for example, be provided on an outer end face 39 which is used to arrange, receive or embed information, such as a code, an order number, an inspection number or the like. The outer end face 39 may be oriented so as to be flush with the mounting surface 38 or may be provided on a cylindrical housing portion 40, which is preferably raised relative to the mounting surface 38. The cylindrical housing portion 40 on the main housing 12 preferably has a diameter of from 20% to 80% of the size of a diameter of an opening 77 in a connection point 76 of a connection device 71 (FIG. 7).

Figures 3, 4, 5:
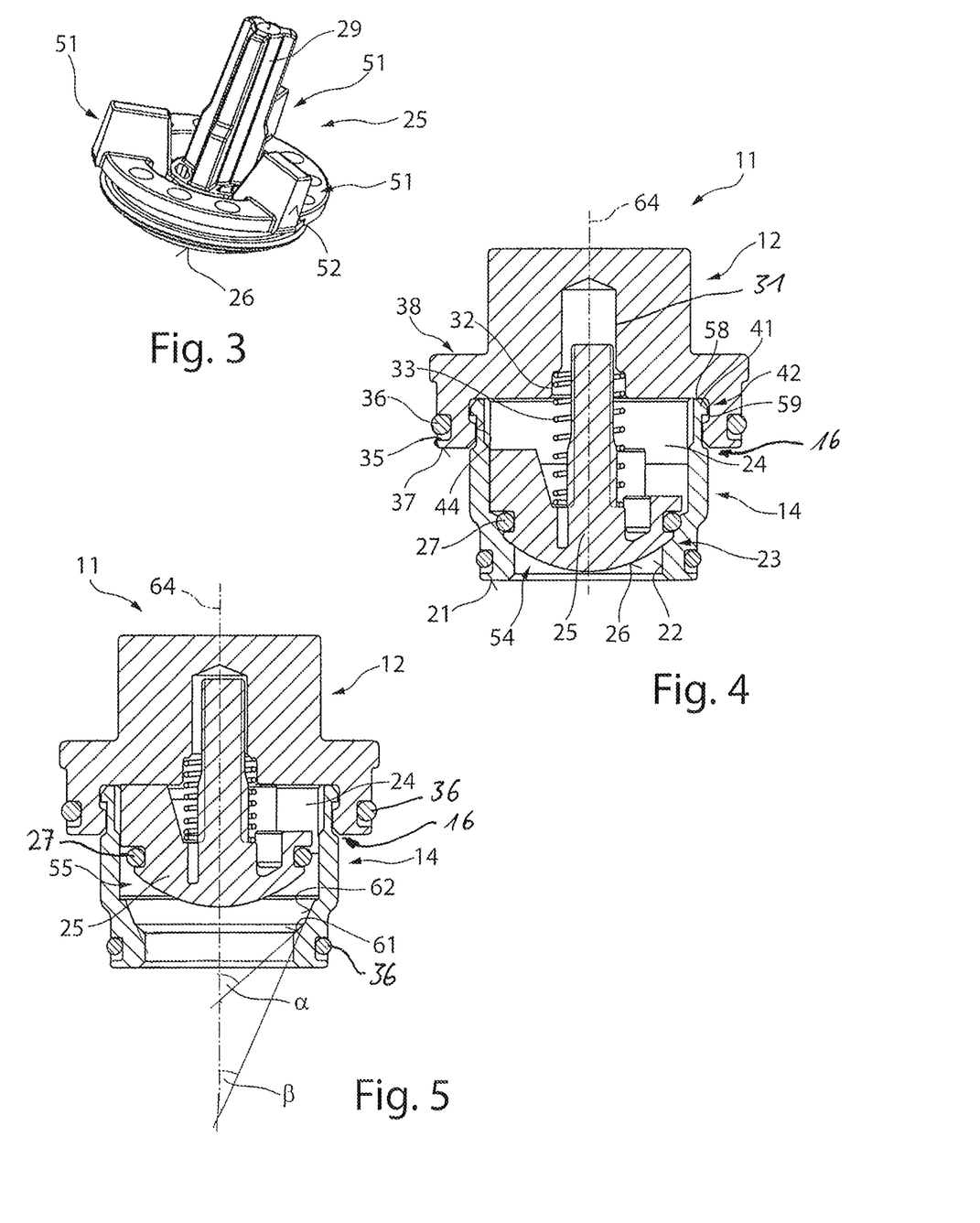
FIG. 3 is a perspective view of a valve-closing member.
FIG. 4 is a schematic sectional view of the non-return valve in a closed position.
FIG. 5 is a schematic sectional view of the non-return valve in an open position.

The interface 16 formed between the main housing 12 and the valve housing 14 comprises connection elements 41, 42. One of the connection elements 41 is formed by one snap-in clip, preferably a plurality of snap-in clips, which are provided on the valve housing 14. One of the connection elements 42 of the interface 16 is formed by an internally circumferential groove 42 on the main housing 12, as shown in FIG. 4. As a result, the valve housing 14 can be inserted into the main housing 12, and the snap-in clips 41 engage in the groove 42. Advantageously, the interface 16 may be designed as a detachable connection.

In order to position the valve housing 14 centrally relative to the main housing 12, a guide flange 44 is provided on an end face 21 of the valve housing 14 so as to be opposite. This guide flange 44 is formed in portions in the radial direction. Advantageously, the snap-in clips 41 are provided between radially circumferentially extending guide surfaces of the guide flange 44.

Through-holes 46 extending in the radial direction are preferably provided between the guide surfaces 44 and the end face 21 of the valve housing 14. Connecting pieces 47, which position the guide portion 44 and the valve seat 23 at a distance, extend between the through-holes 46.

This valve housing 14 makes it possible for a medium to flow in through the valve opening 22 in the axial direction and then to flow out laterally through the through-holes 46 in the radial direction. The valve housing 14 comprising the above-described components is preferably formed in one piece as an injection-moulded part. The main housing 12 is preferably likewise formed in one piece. It may consist of plastics material or a metal, in particular light metal.

FIG. 3 is a perspective view of the valve-closing member 25. Guide fins 51 are provided on a side opposite the closing surface 26. For example, three guide fins 51 are provided on the valve-closing member 25, preferably so as to be evenly distributed over the circumference. The guide fins 51 comprise radially outwardly pointing end faces 52. These end faces 52 abut an inner face of the valve housing 14 and guide the valve-closing member 25 during an opening and closing movement. The length of the end faces 52 has a height which extends at least over the width of the through-hole 46 in the axial direction. As a result, starting from a closed position 54 (FIG. 4) of the valve-closing member 25 through to an opening movement, the valve-closing member 25 is axially guided without snagging in the through-holes 46.

FIG. 4 is a schematic sectional view of the non-return valve 11 according to FIG. 1 in an assembled arrangement. The valve-closing member 25 is provided in a closed position 54. FIG. 5 is a schematic sectional view of the non-return valve 11 in which the valve-closing member 55 is shown in an open position 55. A regulating space 24 is provided between the main housing 12 and the valve housing 14. Within the regulating space 24, the valve-closing member 25 can be actuated between a closed position 54 and an open position 55. The maximum open position 55 of the valve-closing member 25 can be delimited by the length of the guide fins 51 and/or the guide portion 29.

The return element 33 is preferably received and guided by a hole portion 32 that is enlarged compared with the guide hole 31 in the main housing 12. The depth of the hole portion 32 can be accordingly configured to determine a pre-load of the return element 33.

The sectional view according to FIGS. 4 and 5 shows the interface 16, which is preferably detachable.

The first and the second connection element 41, 42 of the interface 16 are oriented relative to one another with axial play. For this purpose, it is provided that the snap-in clip 41 has a distance between an end face 58 of the snap-in clip 41 and an undercut 59 of the snap-in clip 41 that is less than the width of the circumferential groove 42. As a result, the valve housing 14 is arranged with axial play relative to the main housing 12.

The valve housing 14 comprises a valve seat 23, which comprises a support surface 61 and a sealing surface 62. The closing surface 26 of the valve-closing member 25 abuts the support surface 61 in the closed position 54. The sealing surface 62, which the sealing element 27 of the valve-closing member 25 abuts in the closed position 54, is provided adjacently to the support surface 61 or so as to be downstream of the support surface 61 in the flow direction. The support surface 61 and the sealing surface 62 are formed separately from one another. They are preferably adjacent to one another. By means of the support surface 61, the valve-closing member 25 assumes a defined closed position 54. By axially orienting the sealing surface 62 relative to the support surface 61, the sealing element 27 can abut the sealing surface 62 with a predetermined contact pressure. This contact pressure is less than the abutment pressure of the valve-closing member 25 in the support surface 61. This prevents the sealing element 27 from being overstressed or becoming stuck.

In the embodiment according to FIG. 5, it is provided that the support surface 61 is oriented at an angle α to the longitudinal axis 64 of the valve housing 14 or main housing 12 that is in a range of from 10° to 90°, for example. The sealing surface 62 is oriented at an angle β to the longitudinal axis 64 of the valve housing 14 that is less than the angle α. In such an arrangement, the sealing element 27 can have a sealing effect in the radial direction.

Figure 6:
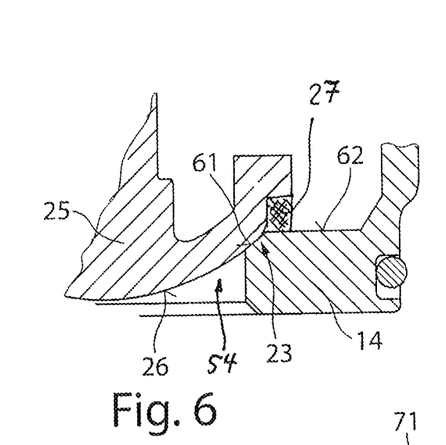
FIG. 6 is a schematic partial view of an alternative configuration of the valve-closing member in the valve housing.

FIG. 6 is a schematic sectional view of an alternative embodiment of the valve-closing member 25 relative to the valve seat 23. In this embodiment, it is provided that the sealing surface 62 is formed at an angle β that is greater than the angle α of the support surface 61 to the longitudinal axis 64 of the valve housing 14. Preferably, the sealing surface 62 is oriented at right angles to the longitudinal axis 64 of the valve housing 14. The sealing element 27 acts on a circumferential shoulder on the valve-closing member 25, such that axial sealing is provided.

In this embodiment of the valve-closing member 25 and the valve seat 23, the sealing element 27 may be formed on the valve-closing member 25 as a two-component injection-moulded part. The sealing element 27 may also be bonded thereto or fixed thereto in an interlocking fit.

In FIG. 7, the non-return valve 11 is arranged in a connection device 71. This connection device 71 may comprise at least one supply opening 72 and at least one discharge opening 74. A connection point 76, through which a medium is guided, is provided between the supply opening 72 and the discharge opening 74. The non-return valve 11 can be inserted into the connection point 76 through an opening 77 and can be fixed to the connection point 76. The connection point 76 preferably comprises a first insertion portion 78, in which the valve housing 14 is positioned. Furthermore, the connection point 76 comprises a second insertion portion 79, in which the main housing 12 is positioned. When the non-return valve 11 is inserted into the connection point 76, the stop surface 37 of the main housing 12 preferably abuts or is supported on a shoulder 81 of the second insertion portion 79. A detachable fastening means 82 is then introduced into the connection point 86. This detachable fastening means 82 acts on the mounting surface 38 of the main housing 12 and fixes the non-return valve 11 in the connection point 76. The detachable fastening element 82 may be designed as a circlip, for example, which can be fastened in a circumferential groove 83.

The non-return valve 11 preferably has an installation dimension E which is determined by a distance between the mounting surface 38 of the main housing 12 and the end face 21 of the valve housing 14. Furthermore, axial play B is provided between the first and the second connection element 41, 42 at the interface 16. The installation length A can be enlarged or extended by the length of the axial play B.

An installation dimension E which includes the first and the second insertion portion 78, 79 is provided for the connection point 76. The installation length A of the non-return valve 11 is less than the installation dimension E when positioning the valve housing 14 relative to the main housing 12. As a result, it is made easier to mount the non-return valve 11 relative to the connection point 76. Once pressure is acting on the non-return valve 11 due to the medium, this valve housing 14 is axially movable relative to the main housing 12 owing to the play B. It may be provided here that the end face 21 of the valve housing 11 abuts the end-face end of the first insertion portion 78, but the first and the second connection element 41, 42 are still positioned relative to one another with little play or are positioned relative to one another without play. As a result, tolerances of the first insertion portion 78 and further tolerances in the positioning relative to the second insertion portion 79 can be compensated for.

Figure 8:
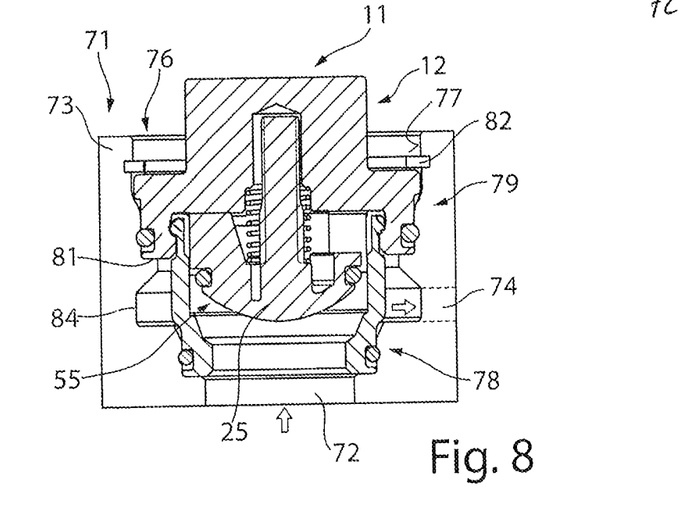
FIG. 8 is a schematic sectional view of the non-return valve in the connection point of the connection device in an operating position.

It can be seen from FIGS. 7 and 8 that both the main housing 12 and the valve housing 14 are each arranged so as to be sealed from the first and the second connection portion 78, 79 by means of a sealing element 36. As a result, medium flows through the non-return valve 11 from the supply opening 72 in the regulating space 24 of the valve housing 14 once the valve-closing member 25 has been moved out of the closed position 54 into the open position 55. The medium then flows through the through-holes 46 in the valve housing 14 into an annular channel 84 in the connection point 76 and, from there, flows out through the discharge opening 74.

The invention claimed is:

1. A non-return valve, which is insertable into a connection point of a connection device, which comprises a supply opening for supplying a medium and an outlet opening for discharging the medium, the non-return valve comprising:
a multi-part housing, which comprises a valve housing and a main housing, which is interconnectable by means of connection elements via an interface, and
a regulating space formed between the main housing and the valve housing, in which space a valve-closing member is provided which abuts a valve seat of the valve housing in a closed position, and closes an opening in the valve housing and is moveable into an operating position counter to an actuating force of a return element and releases the valve opening, wherein the valve housing and the valve-closing member, which is arranged so as to be movable in the regulating space, lie on a common longitudinal axis, and
wherein the interface between the valve housing and the main housing has axial play, by means of which the distance between the valve housing and the main housing is modifiable.

2. The non-return valve according to claim 1, wherein the main housing and the valve housing are movably guided relative to one another along the longitudinal axis by the axial play of the interface or are guided so as to be radially rotatable relative to one another or both.

3. The non-return valve according to claim 1, wherein the interface comprises connection elements, which form a detachable connection between the main housing and the valve housing.

4. The non-return valve according to claim 3, wherein the valve housing comprises the valve opening, which is oriented towards the valve housing in the longitudinal axis, and a radial wall portion adjoins this valve opening, on the end of which opposite the valve opening the at least one connection element of the interface is provided.

5. The non-return valve according to claim 4, wherein through-holes are provided in the radial wall portion of the valve housing and are elongate and extend in the circumferential direction, and connecting pieces which connect the valve seat of the valve housing surrounding the valve opening to the connection elements extend between the through-holes.

6. The non-return valve according to claim 3, wherein the first connection element, which forms the interface, is designed as a circumferential groove, and the second connection element consists of at least one snap-in clip, which engages in the first connection element, and wherein the at least one snap-in clip has a length that is less than the width of the circumferential groove starting from an undercut on the at least one snap-in clip to an end-face end of the at least one snap-in clip.

7. The non-return valve according to claim 3, wherein the connection elements each comprise guide surfaces directed towards one another, wherein a guide surface on the main housing extends from the groove in the axial direction towards the valve housing and the guide surface arranged on an undercut of the snap-in clip extending in the groove.

8. The non-return valve according to claim 1, wherein a circumferential guide flange is provided on the valve housing so as to point towards the main housing, and the valve housing is axially movably and/or radially rotatably guided on a guide surface of the main housing by means of the guide flange.

9. The non-return valve according to claim 8, wherein the guide flange is interrupted by at least one connection element designed as a snap-in clip.

10. The non-return valve according to claim 1, wherein a distance between a mounting portion provided on the main housing, by means of which the main housing is fixed to the connection point by a detachable fastening element, and an end face, opposite the main housing, on the valve housing, when the main housing is arranged relative to the valve housing with a play B, has an installation length A that is less than an installation dimension E in the connection point and, when the main housing is arranged relative to the valve housing without play, the main housing and the valve housing have a length that is greater than or equal to the installation dimension E of the connection point.

11. The non-return valve according to claim 1, wherein a guide portion is provided on a valve-closing member which extends into the main housing and is guided therein in a longitudinally movable manner.

12. The non-return valve according to claim 1, wherein the valve-closing member comprises at least one guide fin opposite the closing surface, which fin extends in parallel with the longitudinal axis of the valve housing and the guide fin comprises a radially outwardly pointing end face, the axial length of which is greater than the width of a through-hole in the radial wall portion.

13. The non-return valve according to claim 1, wherein the valve seat of the valve housing comprises a support surface, on which the valve-closing member is supported in its closed position and comprises a sealing surface, which a sealing element of the valve-closing member abuts, wherein the support surface and the sealing surface are formed separately from one another.

14. The non-return valve according to claim 13, wherein the support surface is oriented at an angle $\alpha$ of between 10° and 90° to the longitudinal axis of the valve housing and the sealing surface is oriented at an angle $\beta$ of 90° or less to the longitudinal axis.

15. The non-return valve according to claim 13, wherein by means of an axial distance between the sealing surface and the support surface on the valve seat, a contact pressure of the sealing element of the valve-closing member in the closed position is adjustable.

16. The non-return valve according to claim 13, wherein a sealing element is mounted on, clamped to, vulcanised onto and/or bonded to the valve-closing member.

17. The non-return valve according to claim 1, wherein the valve housing and/or the valve-closing member is made of plastics material and the main housing is made of plastics material or of a metal material, or of a light metal material.

18. A connection device for a non-return valve,
comprising a connection point, into which the non-return valve is insertable from outside through a connection opening of the connection point,
comprising a base body, in which a supply channel comprising a supply opening is provided, which opens into the connection point in the base body,
comprising an outlet opening, which connects the connection point to an outlet channel,
comprising a first insertion portion in the connection point, which portion is provided between the supply opening and the outlet opening and in which the valve housing is positionable, and comprising a second insertion portion in the connection point, which portion is provided between the supply opening and the outlet opening and in which the main housing of the non-return valve is fixed, wherein the main housing is fixed in the second insertion portion in the axial direction towards the connection point by means of a detachable fastening element, and the valve housing is positioned in the first insertion portion of the connection point so as to be movable in the axial direction.

19. The connection device according to claim 18, wherein the non-return valve is fixed in the second insertion portion by a detachable fastening element, in which portion the main housing is supported on a shoulder of the second insertion portion by the stop surface and the detachable fastening element acts on a mounting portion of the main housing opposite the stop surface and the main housing is fixed in the second insertion portion.

20. The connection device according to claim 18, wherein a sealing element, acting in the radial direction, is provided both between the main housing and the second insertion portion and between the valve housing and the first insertion portion.

* * * * *